MODIFIED QUARTZ AND METHOD OF MAKING

Filed Nov. 5, 1952 2 Sheets-Sheet 1

*INVENTOR.*
EDWARD J. SMOKE
*BY* Harry M. Saragovitz
Attorney

INVENTOR.
EDWARD J. SMOKE
BY
Harry M. Saragovitz
Attorney

United States Patent Office 2,726,964

Patented Dec. 13, 1955

2,726,964

MODIFIED QUARTZ AND METHOD OF MAKING

Edward J. Smoke, Metuchen, N. J., assignor to the United States of America as represented by the Secretary of the Army Application November 5, 1952, Serial No. 318,775

12 Claims. (Cl. 106—46)

Figure 1:
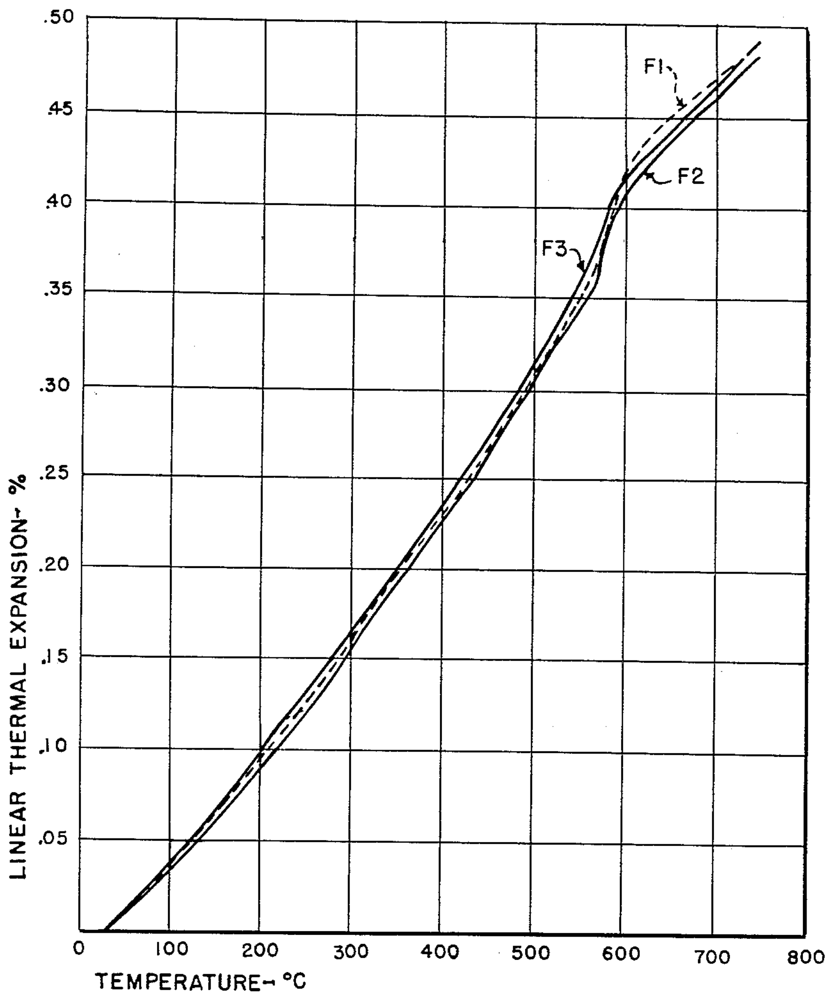

This invention has for its most important and principal object the improvement of the utility of quartz bodies where the abrupt volume change in such bodies occurring when heated to 573° C., impairs their usefulness and value for many purposes. This defect is manifest in electrical devices subject to such temperatures, where a mounting body of quartz or porcelain is coordinated with other materials united therewith, or where a porcelain is used as a dielectric in a condenser. Various other materials may be selected or prepared having a consistent curve of thermal expansion similar to that of quartz below 573° C. through a considerable range of temperatures including and extending above 573°, but if such selected or prepared material is united with a quartz body, the abrupt change in the thermal expansion coefficient of the latter at the critical temperature mentioned results in defects or failures by the stresses and strains set up, usually causing fractures of the associated material or the quartz body.

The peculiar characteristic of expansion at 573° C. accompanies the crystal inversion and change from low temperature quartz to high temperature quartz, in such bodies.

Matching other bodies to the characteristic curve of quartz bodies at the critical temperature mentioned has been found impossible heretofore, and the same is true of attempts to unite quartz bodies to others safely where they are heated to and above the critical temperature.

It is therefore a purpose of the present invention to alter the thermal expansion characteristics of a ceramic quartz body or composition composed largely of quartz, so that it will have the same or substantially the same characteristic curve below a temperature of 573° C. as a conventional quartz body—especially a porcelain—but will closely approximate or symmetrically continue such characteristic lower temperature curve past and above 573° C.

Silica in the cristobalite form also has an objectionable eccentricity in its curve of thermal expansion between 230° and 280° C., but methods are known for remedying this (as, by processing to the tridymite form). It is therefore an important object of the present invention to attain correction or avoidance of such a low temperature variation, and at the same time achieve the correction of the objectionable variations in the coefficient of thermal response of the crystalline body at and adjacent to 573° C.

Specifically, the invention has been utilized to form a dense, strong electrical porcelain body, possessing the desirable physical and electrical properties inherent in a good electrical porcelain, but from which the sudden variation in thermal expansion at 573° C., characteristic of prior porcelains, has been eliminated.

It is a further object to originate novel procedure or steps of process in the preparation and treatment of materials, effective in producing such an improved quartz composition body.

Another aim is to present a formula or formulas of extreme simplicity for the preparation of the necessary composition or body, and which may be prepared with reliance on the attainment of the desired qualities manifest in the resultant bodies produced from the compound material.

Additional objects, advantages and features of invention will be manifest, or understood from or inherent in the following description presenting examples of the invention and from the accompanying drawings and tables, wherein Figure 1 is a graph showing the linear thermal expansion of three silicate test bodies produced with the result in two of them of modifying the objectionable abrupt expansion characteristic heretofore caused by quartz in such a body when the body is heated beyond 573° C. The composition of these is given in Table I hereinafter.

Figure 2A:
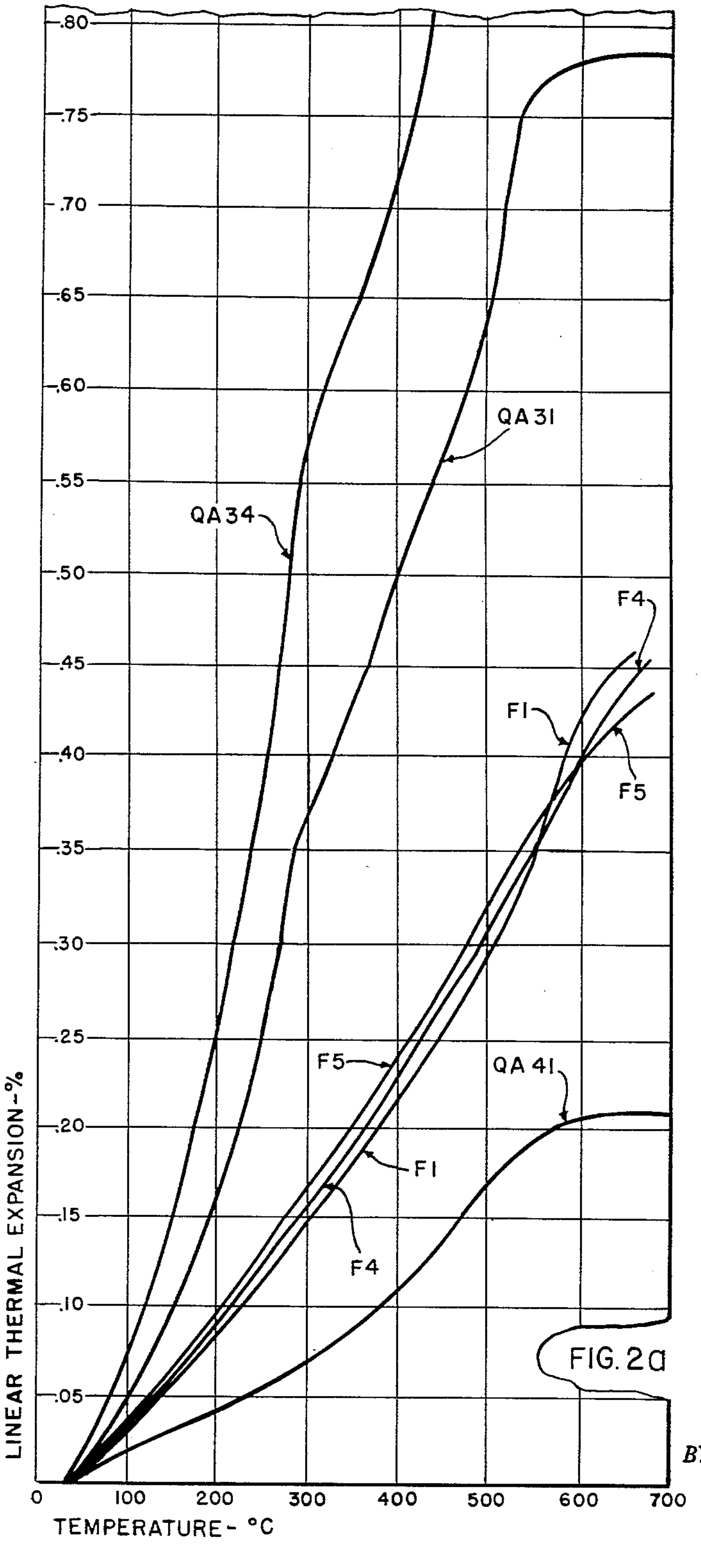
Figure 2B:
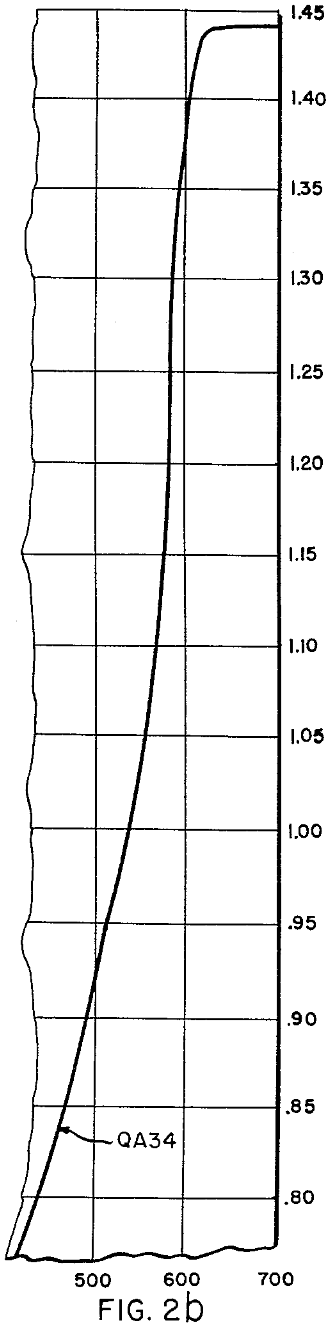

Figure 2–*a* is a similar graph, showing linear thermal expansion curves of bodies QA31 and QA41 compounded and fired to produce new components for a modified quartz; this figure also showing the linear expansion curves of a conventional quartz porcelain F1, and improved porcelains F4 and F5 (the compositions and physical properties of the latter three being in Table II), in which the modified quartz compositions of QA31 and QA41 respectively have been substituted for the conventional flint component of the batch mixtures. This figure and Figure 2–*b* also show the curve for a substantially pure quartz body QA34, using a batch of 100% flint.

Figure 2–*b* shows the upper part of the quartz curve QA34, started in Figure 2–*a*.

The product in a first group was reached by producing a body having between 91% and 97% of its total weight consisting of silica and the remainder made up of a mixture of lithia and alumina in the proportion of one part by weight lithia to three of alumina in one instance (QA31), and one part lithia to two of alumina in another (QA41).

The raw materials are compounded from feldspar, flint, and clay (Edgar plastic kaolin) principally, with a small amount of No. 4 Ball clay and whiting and a lithium content introduced as lithium carbonate. It is also possible by reducing the amount of the principal silica and alumina containing mineral elements, to utilize a mineral component such as spodumene to introduce the lithia required, as shown in batch F3 of the following examples of batch composition. Among others, mixtures which have been used to produce a body approximating the desired thermal characteristics have comprised those designated F2 and F3 following in Table I, the symbol at the top of each column being a batch identification, also used hereinafter to indicate the thermal performance of quartz bodies produced therefrom in tests. The composition "F1" represents a conventional poreclain formula, not modified in conformity with the present invention.

TABLE I

| | F1, percent by weight | F2, percent by weight | F3, percent by weight |
|---|---|---|---|
| Feldspar ($KAlSi_3O_8$) | 35.0 | 32.0 | 29.0 |
| Flint | 25.0 | 25.0 | 21.0 |
| Kaolin (Edgar Plastic Kaolin) | 28.0 | 28.0 | 24.0 |
| Old Mine No. 4 Ball Clay | 10.0 | 10.0 | 10.0 |
| Whiting ($CaCO_3$) | 2.0 | 2.0 | 2.0 |
| Lithium Carbonate | ---------- | 3.0 | ---------- |
| Spodumene | ---------- | ---------- | 16.0 |

Edgar plastic kaolin is a grade of clay corresponding closely to the chemical composition of the ideal China kaolin, and is described in United States Geological Survey Paper No. 11, pages 83–85, 1903.

Old Mine No. 4 Ball Clay is described in 1950–1951 Ceramic Data Book, by Industrial Publications, Inc., Chicago, Illinois, and is a substantially pure aluminum silicate, including $Al_2O_3$, 31%; $SiO_2$, 49%; ignition loss 14.7%.

The mixtures above given were prepared by a refined dry mixing process, batches being weighed, mixed superficially by hand; passed through a pulverizer; suitably screened; dry mixed in a ball mill; wet mixed in a Lancaster mixer with sufficient water for extrusion; then passed through a micropulverizer with screening through holes ⅛ inch diameter. The plastic mixtures thus produced were extruded by a conventional de-airing hydraulic extrusion process, producing bars ½ inch in diameter, which were cut to seven inch lengths, dried and fired to a point above 1800° F., but below 2600° F. in an open fired gas furnace in approximately five hours, followed by an hour soaking period.

Linear thermal expansion was determined by the fused-silica tube dilatometer method. The rate of heating for this test and for similar tests hereinafter referred to was between two and three degrees centigrade per minute, and temperature and expansion were recorded at fifteen minute intervals. The curves of Figure 1, developed from the readings so obtained, showed improvement in the F2 and F3 bodies, but tests of density and physical strength were unsatisfactory for bodies requiring high mechanical strength and imperviousness to moisture, the matured bodies being objectionably vesicular and physically too weak as compared to standards for good electrical porcelain. Also, the firing range became considerably shortened.

For some purposes, especially where heat insulation and electrical insulating properties combined are desired, or where a porous structure is required for other reasons, this product has considerable utility. It is effective for sound absorption also.

I have discovered, however, that a porcelain body analogous to quartz but having a substantially uniform curve of thermal expansion and also having high mechanical strength and high density, may be produced from somewhat similar mixtures by the use of a novel quartz substitute component and procedure originated by me. This component consists of a fired mixture pulverized by steps such as described for the products of Table I, and then fired, so as to produce a matured ceramic modified quartz containing from one to three percent of lithia ($Li_2O$), from three to six percent of alumina ($Al_2O_3$), and from 96 to 91 percent of silica ($SiO_2$). Batch compositions for such a mixture, at opposite extremes of content of the several components were made as follows:

*Modified quartz*

| QA31 | | | | QA41 | | | |
|---|---|---|---|---|---|---|---|
| Batch Composition | | Oxide Composition | | Batch Composition | | Oxide Composition | |
| | *Percent by weight* | | *Percent by weight* | | *Percent by weight* | | *Percent by weight* |
| $Li_2CO_3$ | 2.4 | $Li_2O$ | 1.0 | $Li_2CO_3$ | 6.9 | $Li_2O$ | 3.0 |
| Clay (EPK) | 8.0 | $Al_2O_3$ | 3.0 | Clay | 15.2 | $Al_2O_3$ | 6.0 |
| Flint (potter's) | 89.6 | $SiO_2$ | 96.0 | Flint | 77.9 | $SiO_2$ | 91 |

The thermal expansion characteristics of bodies produced from the above compositions are shown in Figure 2.

These batch mixtures, after comminuting, pulverizing and mixing steps as above described, were placed in fire clay crucibles and calcined to 2300° F. and soaked for half an hour. They were then crushed separately to pass through 200 mesh screen and used alternately as substitutes for the 25% of flint shown in batch "F1" and in the same quantity as the flint replaced. That is to say, the batch formulas, using the modified quartz components, then read as below in Table II, where they are designated "F4" and "F5". "F1" in Table II is a mixture chosen as a conventional porcelain composition, typical of the prior art, and producing a porcelain body equal to or closely approximating the best quality porcelain heretofore available for electrical uses.

The calcining of this material should be above 1800° F., but below 2600° F. as before indicated. (At the latter temperature the quartz changes to cristobalite.)

TABLE II

Composition and properties data: F Series.
F1: Conventional porcelain. F4 and F5: Improved electrical porcelain.

| | F1, Percent by weight | F4, Percent by weight | F5, Percent by weight |
|---|---|---|---|
| Feldspar ($KAlSi_3O_8$) | 35 | 35 | 35 |
| Kaolin | 28 | 28 | 28 |
| No. 4 Ball Clay | 10 | 10 | 10 |
| Whiting | 2 | 2 | 2 |
| Flint | 25 | | |
| QA31 | | 25 | |
| QA41 | | | 25 |

QA31 and QA41 were calcined to 2300° F. for ½ hour and pulverized to pass 200 mesh.

| Firing Temperature, ° F., and Moisture Absorption, Percent | F1 | | F4 | | F5 | |
|---|---|---|---|---|---|---|
| | ° F. | Percent | ° F. | Percent | ° F. | Percent |
| Rods | 2,180 | .29 | 2,800 | .32 | 2,050 | 4.66 |
| Do | 2,220 | .00 | | | 2,090 | 0.04 |
| Disc | | | 2,250 | .02 | 2,180 | 0.02 |
| | ° F. | lbs. p. s. i. | ° F. | lbs. p. s. i. | ° F. | lbs. p. s. i. |
| Firing Temperature ° F. and Transverse Strength, p. s. i. | 2,220 | 6,195 | 2,180 | 5,710 | 2,050 | 5,040 |
| | | | 2,200 | 5,680 | 2,090 | 4,460 |
| | | | 2,220 | 4,810 | 2,290 | 4,330 |

| | F1 | | F4 | | F5 | |
|---|---|---|---|---|---|---|
| Firing Temperatures | 2250° F. | | 2250° F. | | 2180° F. | |
| Dielectric Values | Dry | Wet | Dry | Wet | Dry | Wet |
| Power Factor (Percent) | .769 | No Reading. | .655 | .867 | .705 | 3.00 |
| Dielectric Constant | 6.27 | | 6.15 | 6.76 | 5.91 | 7.30 |
| Loss Factor (Percent) | 4.82 | | 4.03 | 5.85 | 4.17 | 21.0 |

For the wet test the specimens were boiled one hour and soaked six days.

The thermal expansion characteristics of matured porcelain bodies produced from the above mixtures are shown in Figure 2.

The porcelain body F1 showed the sudden increase in linear thermal expansion at approximately 573° C. when heated gradually from room temperature as mentioned for testing the first mentioned compositions.

The materials of the batches F4 and F5 last described were broken, mixed, and pulverized, and a moldable mix with water produced, from which bodies were extruded in the manner and shapes first described. The firing of these was carried out as before described, different specimens in each formula being heated to different maxima, as shown in Table II, ranging from 2180° F. to 2290° F. The heating for tests producing the curves of Figure 2*a* was also at the rate of between two and three degrees C. per minute, and readings taken at fifteen minute intervals.

Table II also shows moisture absorbent characteristics, transverse strength, power factor, dielectric constant, and loss factors for the several materials. Figure 2*a* shows curves for formulas F4 and F5 developed from readings of tests last mentioned, together with the curve for the conventional porcelain formula F1, as a comparison. This figure was derived from dilatometer readings, and readings by interferometer were also taken confirming these values but showing more angular response to the slight variations in F1 and F4 manifest in Figure 2*a*. The slight trace of variance remaining in one of the curves may be attributable to the small amount of free quartz particles developed in, and incident to, the firing of the clay content of the mixture, the free quartz possibly appearing in the clay after the major quartz content has been matured to the modified form. The difference in fusing temperatures of clay and feldspar are significant in this respect. X-ray analysis shows a quartz crystal form in specimens of bodies produced from compositions QA31 and QA41. The maturing time has been greatly reduced also, which is of advantage in economy of production, requiring shorter and thus cheaper tunnel kilns, as well as requiring less fuel because of shorter firing time.

The objectionable increase in thermal expansion rate manifest in quartz and porcelain heretofore has, in the final products above described, been removed or so reduced as to be without substantial effect in the uses to which electrical porcelain and like quartz compositions are applied.

While the transverse strength of the porcelain bodies F4 and F5 is somewhat less than that of the body F1, these bodies are still practical materials for use as dielectrics where good mechanical and structural strength is required. From the data on moisture absorption versus firing temperature, and transverse strength versus firing temperature, it appears that body F4 has a good firing range; the sudden thermal expansion at 573° C. is removed, and the electrical properties appear to be better than those of the regular porcelain represented by F1. Body F5 has a much shorter firing range; its transverse strength is approximately 15% lower than that of body F4; its linear thermal expansion curve is very good, and its electrical properties in the dry state are good. In the wet state, however, even though the specimen is vitrified, the results are very poor. Thus, the substitution of calcined QA31 for the natural quartz component in the mixture for standard porcelain does not deleteriously affect the maturing temperature or firing range of this porcelain body, but the substitution of QA41 does lower the firing range, maturing temperature and transverse strength of the basic body.

The removal of the sudden change in thermal expansion at 573° C. as thus accomplished has no effect on the thermal shock resistance of this type of body. All these bodies fail on the same temperature cycle using a standard test method for such purposes.

The removal of the sudden thermal expansion at 573° C. should prove of considerable importance and value during the firing operations with such bodies, particularly where the specimens are large, and fractures in the kiln with short firing times will be less of a liability.

It has been demonstrated with certainty that physical and electrical properies, firing range and maturing temperature of porcelain body formulas are, for all practical purposes, either unaffected or improved when the modified quartz substituted for the flint component in porcelain mixtures has the approximate formula: 96% silica, 1% lithia, and 3% alumina, and is calcined to 2300° F. for ½ hour before incorporation in the porcelain batch mixture, and the mixture otherwise conventionally processed to the production of solid bodies.

The results of this demonstration show that the limits for silica, that is, between 91 and 97 percent, are effective in the preparation of the modified quartz for use (as a component) in porcelain mixtures, but that the proportion or ratio of lithia to alumina may be chosen between 1:3 and 1:2 in preparing the remainder of the mixture.

It will be noted from the curves in Figure 2*a* derived from bodies QA31 and QA41 that, while the curve for the first named involves a much higher degree of expansion for the same range of temperatures used in the curves for the quartz porcelain curve and for compositions F4 and F5, and QA41 shows a much lower degree of expansion in the same range of temperature, still, in both curves QA31 and QA41, there is no abrupt rise manifest at 573° C., indicating that while these compositions produce a quartz-like body, the objectionable jog at 573° C. has been removed.

Experiments have been conducted with compositions with components of silica, alumina and lithia outside the limits above indicated as effective for the purposes indicated, and these experiments have demonstrated that such departures will not include a substitute having the desired properties. Thus (QA35) using 99% silica, plus 1% lithia, a thermal expansion curve was obtained which manifested a low temperature aberration similar to that of cristobalite. The same was true using (QA36) 96% silica and 4% lithia, although the coefficient of linear expansion was reduced below that of the QA35 specimen. Also, varying the proportion of lithia and substituting alumina, maintaining the silica above 97%, unsatisfactory curves were likewise obtained. For instance (QA32), using 98% silica, 1.5% alumina and 0.5% lithia, resulted in a curve with the objectionable form at 573° C., and the same was true where (QA37) 4.2% alumina and 1% lithia were used, the latter with the QA36 example, and other mixtures, indicating that variation from the ratio of between 2 to 1 and 3 to 1 of alumina and lithia with silica between 91% and 97% introduces objectionable characteristics. Then (QA38), using 90.5 silica, alumina 7.7 and lithia 1.8, a curve closely resembling that of QA36 became manifest. Using 94.7% silica, 3.8% alumina and 1% lithia (QA39) produced a body with a highly objectionable abrupt rise at and immediately above 573° C.

What is claimed:

1. A quartz-like ceramic body having a substantially uniform and constant coefficient of expansion through a range of temperatures from below 573° C. and thereabove, and consisting of a mixture of silica, alumina and lithia minerals in amounts respectively to constitute the following oxide components, the lithia and alumina in all cases being in mutual proportions having at one extreme a ratio of 1 to 3, and at the other extreme 1 to 2 by weight

| | Percent by weight |
|---|---|
| Silica | 91 to 97 |
| Alumina | 0.75 to 6.75 |
| Lithia | 0.25 to 2.25 |

2. A ceramic material composed principally of silica substantially without abrupt variation in coefficient of thermal expansion when heated to and above 573° C.

consisting of, by weight, from 2.25% to 6.75% alumina, from 0.75% to 2.25% lithia, the lithia and alumina ratio varying within the limit of approximately 1 to 3 at one extreme and approximately 1 to 2 at another extreme.

3. The method of producing a porcelain body with mechanical strength and density substantially the same as those of conventional good electrical porcelain, but having a substantially uniform curve of expansion through 573° C., comprising the steps of compounding a flint substitute ceramic component mixture consisting essentially of from 1% to 3% lithia, by weight;
3% to 6% alumina,
91% to 96% silica;

calcining a mass of said mixture, comminuting the calcined material, preparing a final batch pulverulent mixture consisting of substantially, by weight:

| | Percent |
|---|---|
| Feldspar | 35 |
| Kaolin | 28 |
| Ball clay | 10 |
| Whiting | 2 |

Said calcined material 25%, mixing said final batch with water to a mouldable condition, moulding a final body therefrom, and firing the final body at a temperature between 1800° F. and 2600° F. until matured as an electrical porcelain.

4. The method of claim 3 wherein said mixture of lithia, alumina and silica is calcined at a temperature between 2300° F. and 2600° F.

5. The method of claim 4 wherein the final body is fired to above 2200 degrees F., but less than 2600 degrees F.

6. The method of claim 3 wherein the final body is fired to above 2200 degrees F., but less than 2600 degrees F.

7. The new component product for substitution in place of simple silica in otherwise conventional porcelain compositions, to substantially eliminate the abrupt changes in curve of linear thermal expansion of the final porcelain body due to conventional quartz characteristics, said new component product consisting of—by weight—from 91 per cent to 97 percent silica, the remainder of said new component consisting of alumina and lithia in the ratio of, by weight, from two to one to three to one.

8. A porcelain body having approximately conventional amounts of alumina and a silica content characterized by the presence of, by weight from 0.75% to 3.00% $Li_2O$ and from 2% to 6.75% additional $Al_2O_3$ as a substitution for an amount of $SiO_2$ in the batch mixture equal to the sum of the quantities of $Li_2O$ and $SiO_2$ substituted, said body being characterized by a linear thermal expansion curve of substantially symmetrical form, without abrupt change through 573 degrees centigrade, a dry power factor from .655 to .705; a dielectric constant from 5.91 to 6.5 at least, when dry; a transverse strength of from 4300 to 5700 pounds per square inch; and moisture absorption from 0.02% to 0.32% when fired to between about 2180° F. and about 2250° F.

9. An improved porcelain body of lightweight and vesicular quality for use as a heat and electrical insulator, sound absorption and other, consisting essentially of, by weight, from 29% to 32% feldspar, 21% to 25% flint, 24% to 28% kaolin, 10% No. 4 Ball clay; and from 3% to 9% of a component consisting of one part lithia to three parts alumina.

10. An improved electrical porcelain body consisting essentially of a main mixture of, by weight, feldspar 35%, kaolin 28%, Ball clay 10%, Whiting 2% and 25% of a modified quartz product consisting of a calcine composed of, by weight, $Li_2O$ 1%, $Al_2O_3$ 3% and $SiO_2$ 96%.

11. In ceramic compositions composed predominantly of quartz constituents and fired at quartz-maturing temperatures below 2600° F., a modified quartz component for replacement of a major part of conventional silica batch components in such compositions, said modified quartz component consisting essentially of, by weight, from 91 per cent to 97 per cent silica, and the remainder of a quartz-modifying mixture consisting essentially of alumina and lithia in the ratio of, by weight, from about two to one to about three to one, said modified quartz component being calcined.

12. The modified quartz component of claim 11 fired to a temperature between 2200° F. and 2600° F.

References Cited in the file of this patent

UNITED STATES PATENTS 2,351,204 Harvey et al. ---------- June 13, 1944

FOREIGN PATENTS 376,398 Germany ---------- 1923